US012681898B2

(12) United States Patent
Phatak et al.

(10) Patent No.: US 12,681,898 B2
(45) Date of Patent: Jul. 14, 2026

(54) ENHANCED CACHING OPERATIONS BASED ON A COHERENCY METRIC

(71) Applicant: NetApp, Inc., San Jose, CA (US)

(72) Inventors: Shirish Phatak, Bedminster, NJ (US); Vaishnav Kumar Kovvuri, San Jose, CA (US); Sunil Sadashivan Nair, Kerala (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/923,862

(22) Filed: Oct. 23, 2024

(65) Prior Publication Data

US 2026/0111394 A1    Apr. 23, 2026

(51) Int. Cl.
*G06F 16/172*        (2019.01)
*G06F 16/176*        (2019.01)
*G06F 16/178*        (2019.01)

(52) U.S. Cl.
CPC ........ *G06F 16/172* (2019.01); *G06F 16/1774* (2019.01); *G06F 16/178* (2019.01)

(58) Field of Classification Search
CPC .. G06F 16/172; G06F 16/1774; G06F 16/178; G06F 16/10; G06F 12/0828; G06F 12/0831; G06F 11/2071
USPC ........................................................ 707/822
See application file for complete search history.

(56) References Cited

U.S. PATENT DOCUMENTS

| | | | |
|---|---|---|---|
| 5,561,799 A * | 10/1996 | Khalidi ................... | G06F 16/10 |
| | | | 707/999.2 |
| 7,272,613 B2 | 9/2007 | Sim et al. | |
| 7,475,207 B2 * | 1/2009 | Bromling ............ | G06F 11/2079 |
| | | | 709/214 |
| 8,489,817 B2 | 7/2013 | Flynn et al. | |
| 9,621,399 B1 | 4/2017 | Parakh et al. | |
| 9,646,022 B2 | 5/2017 | Lin et al. | |
| 9,852,149 B1 | 12/2017 | Taylor et al. | |
| 10,579,615 B2 | 3/2020 | Bernbo et al. | |
| 11,467,967 B2 | 10/2022 | Zhang et al. | |
| 2004/0162805 A1 * | 8/2004 | Wozniak ................. | G06F 30/33 |
| 2007/0022264 A1 * | 1/2007 | Bromling ............ | G06F 11/2071 |
| | | | 711/168 |
| 2020/0356481 A1 * | 11/2020 | Jagtap ................. | G06F 12/0828 |
| 2022/0014588 A1 * | 1/2022 | Guim Bernat ...... | G06F 12/0831 |
| 2023/0071303 A1 * | 3/2023 | Jagtap ................. | G06F 12/0828 |

* cited by examiner

*Primary Examiner* — Shahid A Alam

(57) ABSTRACT

A global policy-driven framework for managing, revising, and implementing data coherency policies in a distributed data storage system. An edge node of the distributed data storage system receives a request from an application to store a data object in the system. The edge node, in response to receiving the request to store the data object, generates a coherency policy request, which is then submitted to the primary node of the system. The primary node of the system generates a coherency policy response, which is returned to the edge node. The edge node then stores the data object in the system in accordance with the coherency policy response.

20 Claims, 11 Drawing Sheets

100

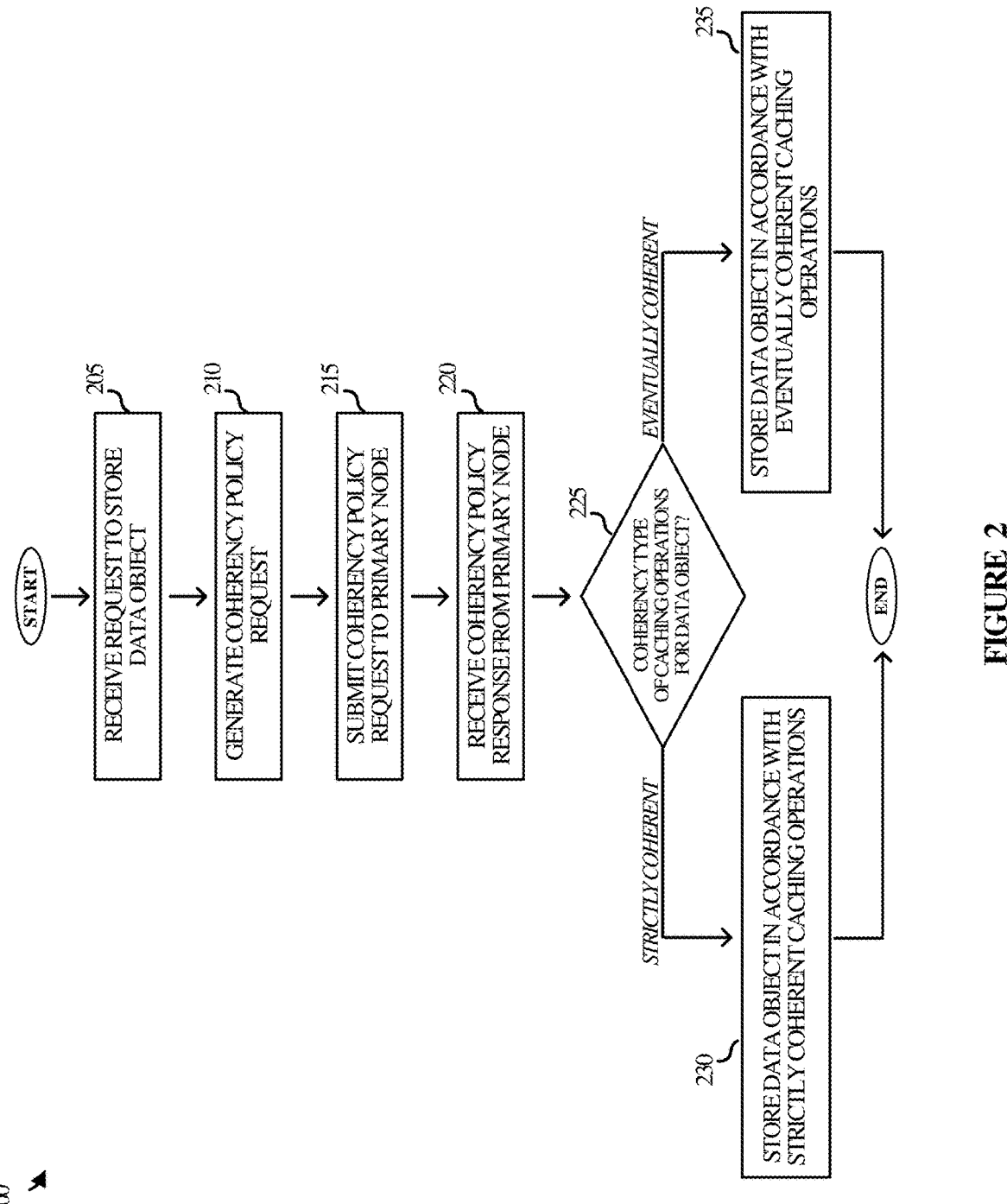

200

START

RECEIVE REQUEST TO STORE DATA OBJECT
205

GENERATE COHERENCY POLICY REQUEST
210

SUBMIT COHERENCY POLICY REQUEST TO PRIMARY NODE
215

RECEIVE COHERENCY POLICY RESPONSE FROM PRIMARY NODE
220

COHERENCY TYPE OF CACHING OPERATIONS FOR DATA OBJECT?
225

STRICTLY COHERENT

STORE DATA OBJECT IN ACCORDANCE WITH STRICTLY COHERENT CACHING OPERATIONS
230

EVENTUALLY COHERENT

STORE DATA OBJECT IN ACCORDANCE WITH EVENTUALLY COHERENT CACHING OPERATIONS
235

END

FIGURE 2

START

705
OBSERVE DISTRIBUTED DATA
STORAGE SYSTEM OPERATION

710
Operational Patterns of
the Distributed Data Storage
System Identified?

NO

YES

715
GENERATE COHERENCY POLICY
REVISION AT PRIMARY NODE

720
UPDATE A COHERENCY POLICY BASED
ON COHERENCY POLICY REVISION

END

FIGURE 9

ENHANCED CACHING OPERATIONS BASED ON A COHERENCY METRIC

TECHNICAL FIELD

Aspects of the disclosure are related generally to the field of data storage, and in particular to management and implementation of data storage policies.

BACKGROUND

In distributed data storage systems, many users may not be located in the same geographic location as the system. To carry out data storage operations, these users commonly interact with the distributed data storage system through the system's edge nodes. To support data storage operations for remote users at edge nodes of the distributed data storage system, files or data objects can be cached at each edge node. Strictly coherent caching and eventually coherent caching are two kinds of caching regularly used to support performance at edge nodes in distributed data storage environments.

Strictly coherent caching, often referred to simply as caching, allows low-latency performance at the edge, enabling improved storage operations for remote users. Features of strictly coherent caching, such as global file locking and immediate updating of cached copies of data, facilitate real-time cooperative and collaborative work on cached data by users anywhere in the world. These mechanisms preserve the coherency of stored data, ensuring users are served only the most current versions of data from across the entire distributed data storage system.

Unfortunately, the locks and other mechanisms used to preserve a stored file's coherency in accordance with strictly coherent caching require substantial overhead. This is particularly true in the case of sparse data (e.g., a very high number of small files). To mitigate this drain on resources, data can be cached at the data system's edge nodes in accordance with eventually coherent caching as opposed to strictly coherent caching. Eventually coherent caching, commonly referred to as replication, generally supports low-latency performance at the edge while requiring much less overhead than strictly coherent caching. Unfortunately, many files or data objects are poor candidates for eventually coherent caching.

The coherency of stored data is regularly a key concern. Problematically, eventually coherent caching may result in disparate copies of a file, particularly where synchronization processes at the application layer attempt to merge various revisions of the data made by multiple users at multiple locations. In other words, eventually coherent caching can result in versions of a data object or file that are not congruent with other versions of the data object or file. Where the coherency of the data in a file or object is a key priority, using eventually coherent caching can cause a wide variety of problems as a result of having multiple copies of the file or data object with varying degrees of inconsistency. On the other hand, despite being resource intensive, strictly coherent caching of data at edge nodes supports effective collaboration across the entire distributed data storage system while preserving the coherency of data being operated on.

Problematically, the tension between strictly coherent caching and eventually coherent caching and their respective benefits and drawbacks remains a challenge to optimizing data storage operations in distributed data storage systems.

As such, techniques for dynamically managing and uniformly implementing storage policies in distributed data storage systems are needed.

SUMMARY

To overcome the tension between strictly coherent caching and eventually coherent caching in distributed data storage systems, a global policy-driven framework is disclosed. The disclosed framework dynamically evaluates data objects or data files to determine if the object or file should be stored in the system in accordance with strictly coherent caching or eventually coherent caching. The data object or data file corresponds to a request to store a data object or data file in the system. An application remote to the system originates the request, which is submitted to one of the system's edge nodes. The edge node queries a primary node of the system for a policy that informs how the data object or data file is to be treated, and in particular, if the data object or data file should be stored in the system in accordance with strictly coherent caching or eventually coherent caching. The primary node of the system generates a response that includes the information governing how the data object or data file is to be treated and globally implements the response by distributing the information to each of the edge nodes of the system.

An edge node of the distributed data storage system receives a request from an application to store a data object in the system. The edge node, in response to receiving the request to store the data object, generates a coherency policy request, which is then submitted to the primary node of the system. The primary node of the system generates a coherency policy response, which is returned to the edge node. The edge node then stores the data object in the system in accordance with the coherency policy response.

In some scenarios, a given data object is stored in the system in accordance with a coherency policy response comprising strictly coherent caching operations. Under strictly coherent caching operations, while a data object is being accessed, copies of the data object throughout the system are locked. When modifications to the data object being accessed have been persisted to storage in the system, the copies of the data object throughout the system are unlocked and updated to uniformly reflect the modifications. In some scenarios, a given data object is stored in the system in accordance with a coherency policy response comprising eventually coherent caching operations. Under eventually coherent caching operations, copies of a data object are not locked while the data object is being accessed. When modifications to the data object being accessed have been persisted to storage in the system, disparate copies of the data object may remain in the system. After some delay, the system may merge the disparate copies of the data object.

In some scenarios, a machine learning model is leveraged to support generating the coherency policy response. In some scenarios, training data is generated and used to train the machine learning model, which is then deployed to one or more nodes of the data storage system. In such scenarios, the training data includes metadata descriptive of one or more data objects and a storage treatment for each of the one or more data objects. The storage treatment corresponds to a coherency policy applied with regard to storing each respective data objects in the distributed data storage system. Each of the one or more objects are inputted to the machine learning model, which is configured to return a coherency policy response for each of the one or more data objects. The output for each of the one or more data objects is compared to the storage treatment for each of the one or more data objects. Based on the comparing for each of the one or more data objects, the machine learning model can be updated until such a time when the machine learning model provides coherency policy outputs that match the storage treatments for some predetermined threshold percentage or threshold amount of the one or more data objects.

This Summary introduces a selection of concepts in a simplified form that are further described below in the Technical Disclosure. It may be understood that this Summary is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

FIG. 2 illustrates a method of operating a distributed data storage system in accordance with an implementation.

FIG. 9 illustrates a computing device used in accordance with some implementations.

DETAILED DESCRIPTION

Figure 1:
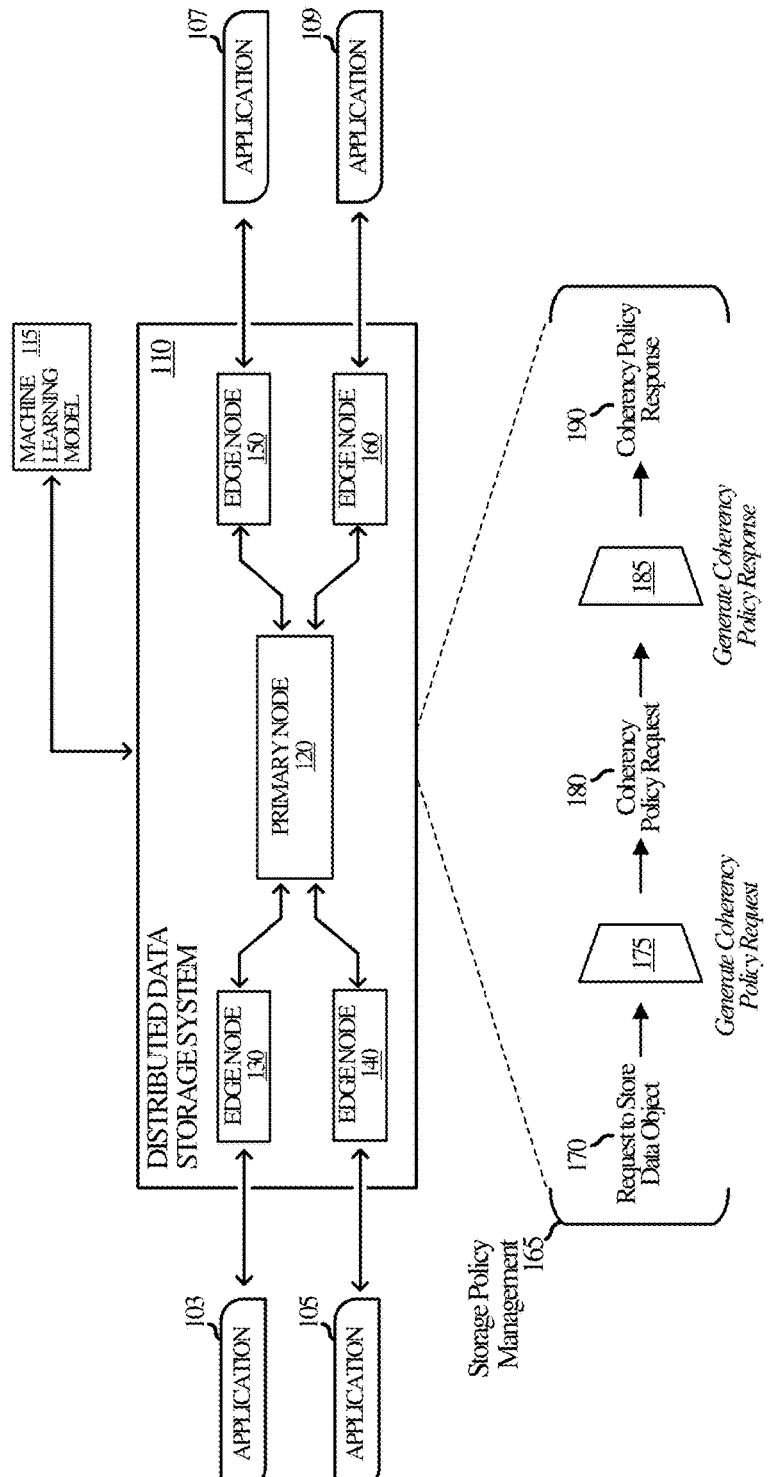
FIG. 1 illustrates an operational environment in accordance with an implementation.

To overcome the tension between strictly coherent caching and eventually coherent caching in distributed data storage systems, a global policy-driven framework is disclosed. The disclosed framework dynamically evaluates data objects or data files to determine if the object or file should be stored in the system in accordance with strictly coherent caching or eventually coherent caching. The data object or data file corresponds to a request to store a data object or data file in the system. An application remote to the system originates the request, which is submitted to one of the system's edge nodes. The edge node queries a primary node of the system for a policy that informs how the data object or data file is to be treated, and in particular, if the data object or data file should be stored in the system in accordance with strictly coherent caching or eventually coherent caching. The primary node of the system generates a response that includes the information governing how the data object or data file is to be treated and globally implements the response by distributing the information to each of the edge nodes of the system.

Described herein are methods and apparatus for a global policy driven framework for strictly coherent caching and eventually coherent caching at edge nodes of a distributed data storage system. An edge node of the distributed data storage system receives a request to store a data object or file from an application. The edge node receives the request and generates a coherency policy request that seeks information to guide how the data object or file is to be stored in the distributed data storage system.

The edge node sends the coherency policy request to a primary node of the distributed data storage system. The coherency policy request includes an indication of the data object, a request regarding how the edge node is to treat the request to store the data object, and one or more characteristics of the data object. In response, the primary node evaluates the data object and selects a coherency policy. The primary node then generates a coherency policy response that includes the selected coherency policy. A coherency policy is a policy that defines strategies for operating a distributed data storage system in a particular way based on the relative priority that coherency represents with regard to a data object to be stored. The coherency policy response is sent back to the edge node that originally submitted the coherency policy request, and the edge node stores the data object in accordance with the coherency policy in the coherency policy response.

To facilitate determining a coherency policy, the primary node of the distributed data storage system dynamically evaluates the one or more characteristics and the indication of the data object in the coherency policy request. Based on the one or more characteristics and the data object, a coherency policy is selected. In some scenarios, the one or more characteristics of the data object are a data object type and an application corresponding to the data object. For example, a data object type may be a string, a pointer, an array, and the like, while an application corresponding to the data object could be the application that created the data object, the application that originated the request to store the data object, or some other application associated with the data object. In some other scenarios, determining the coherency policy is performed with the aid of vector analysis. A vector is generated that represents the data object, where the components of the vector correspond to characteristics of the data object. The vector is then submitted to a machine learning model configured to receive a vector for a data object as an input and to return a coherency policy. The output of the machine learning model can then be used to inform, or be used as, the primary node's selection for a coherency policy.

The dynamic evaluation is facilitated by the edge nodes of the distributed data storage system but does not rely on user end points. Instead, Network Attached Storage (NAS) protocols are extended to the edge nodes of the distributed data storage system. These protocols allow features like global file locking to be uniformly implemented at the edge nodes via the storage layer. The storage layer supports the uniform application of global file locking across the entire distributed data storage system and represents a significant improvement in efficiency and ease of use compared to implementing solutions at the application layer.

Where the evaluation shows that the data in a file or object has a higher value placed on coherency and a lower value placed on economy of storage space, the file or object is a good candidate for caching. As such, a coherency policy corresponding to strictly coherent caching operations is selected. Where data in a file has a lower value placed on coherency and a higher value placed on economy of space, the file or object is a good candidate for replication. As such, a coherency policy corresponding to eventually coherent caching operations is selected.

Strictly coherent caching operations are processes that ensure a request to read data submitted to the distributed data storage system for data stored therein reflects the most recent write for that data across all caches and primary storage. Strictly coherent caching operations may also be referred to as strong consistency caching operations, and occasionally as simply caching. Once data is updated in one cache at an edge node, all other caches of all other edge nodes holding the data object must either immediately update their cached copies or else invalidate those copies, ensuring that no stale or inconsistent data is served to a client.

Eventually coherent caching operations are processes that copy data across multiple systems or locations to ensure redundancy and availability. Eventually coherent caching operations differ from strictly coherent caching operations in that a delay occurs before updates are propagated across the caches and storage of the distributed data storage system. The delay in eventually coherent caching may be defined on the order of processor cycles, seconds, minutes, conditioned on some other occurrence, or by some other means of defining a period of delay. Eventually coherent caching operations may also be referred to as eventual consistency caching operations, and in some cases, replication. Under eventually coherent caching operations, there is no guarantee that all caches and storage immediately reflect the change to a file or data object resulting from a most recent write operation. Over time, all caches and storage are merged to the same consistent state, ensuring that all caches will eventually converge to the same and most-recent version of the data.

In some embodiments, the primary node distributes the coherency policy response to each of a number of other edge nodes in the distributed data storage system. Each edge node implements the coherency policy in the coherency policy response by storing the data object in accordance with the coherency policy. In some scenarios, each of the other edge nodes of the distributed data storage system include a copy of the data object, while in other scenarios, an intelligent caching process determines which data objects or files should be stored on which edge nodes in order to optimize data storage operations. Where an edge node of the distributed data storage system includes a copy of the data object at issue, the data object is to be stored in the edge node in accordance with the coherency policy response.

In some embodiments, an edge node of the distributed data storage system receives a request to access or modify a data object that is stored in accordance with strictly coherent caching operations. The edge node, in response, generates a lock request and transmits the lock request to the primary node. The lock request, which includes an indication of the data object to be locked, facilitates relatively high coherency requirements by blocking other users from accessing the particular data object. The primary node receives the lock request from the edge node of the distributed data storage system. In response to the lock request, the primary node generates a corresponding lock instruction. The lock instruction is then sent to each other edge node, which in response, locks the file or data object associated with the request.

In some scenarios, the edge node having originated the lock request subsequently generates an unlock request. The unlock request is transmitted to the primary node, which generates an unlock instruction. The unlock instruction is then distributed to each of the edge nodes. In some cases, only the edge nodes having previously received the lock instruction receive the unlock instruction. Where a data object is locked by an edge node and another edge node receives a request from an application to access or modify the data object, the other edge node blocks the request and returns an error to the application. In some scenarios, a user is revising a data object that is then locked by another user at another edge node while the user is still interacting with the data object. Here, where the user directs the application to persist the revised data object to storage, the action is blocked, and an error message is returned.

In some embodiments, the primary node leverages machine learning to update coherency policies. In such embodiments, a machine learning algorithm is leveraged that is configured to receive observations of operational patterns in the distributed data storage system as an input, and in response, to generate a coherency policy revision. The coherency policy revision represents a suggestion for modifying one or more coherency policies based on the operational patterns of the distributed data storage system. The primary node receives the coherency policy suggestions, and in some cases, revises one or more coherency policies based on the coherency policy suggestions.

In some embodiments, each edge node of the distributed data storage system further includes a local policy repository. In response to receiving the coherency policy response from the primary node, each edge node of the system implements the coherency policy response. To implement the coherency policy response, each edge node queries a local policy repository contained therein in order to retrieve the actual coherency policy referenced in the coherency policy response.

Various embodiments of the present technology provide for a wide range of technical effects, advantages, and/or improvements to computing systems and components. For example, various embodiments may include one or more of the following technical effects, advantages, and/or improvements: 1) non-routine and unconventional implementation of storage policies based on dynamic evaluation of data objects and data files; and 2) non-routine and unconventional use of network attached storage protocols to uniformly implement policies relating to data storage.

Referring to the first technical effect listed above, embodiments of the present technology support and enhanced ability to dynamically apply storage policies in order to improve both storage system performance and resource consumption. Storage policies are selected on a per-object or per-file basis predicated on the individual characteristics of each file or object. This allows for the best coherency policy for each file or object to be applied to that file or object without regard to other files or objects in the distributed data storage system. As a result, storage policies can flexibly applied to a large number of data files or data objects without the significant drain on resources associated with caching all files or objects and without the significant detriment to data coherency associated with replicating all files or objects.

Referring to the second technical effect listed above, embodiments of the present technology support and enhanced ability to uniformly apply dynamically determined storage policies in a distributed data storage system. Implementing a coherency policy at the storage layer in a distributed data storage system enhances efficiency, scalability, and consistency of the system overall by centrally managing data placement, caching, replication, and access rules, reducing the complexity and overhead of managing these aspects when compared with management at the application layer. Further, managing storage policies at the storage layer minimizes the risk of inconsistencies or errors that could arise from diverse or manually applied policies across different applications in the application layer.

FIG. 1 illustrates operational environment 100 in accordance with an implementation. Operational environment 100 includes application 103, application 105, application 107, application 109, distributed data storage system 110, hereinafter represented by system 110, and machine learning model 115. System 110 includes primary node 120, edge node 130, edge node 140, edge node 150, edge node 160. System 110 120 further includes coherency policy management 165, which includes request to store data object 170, generate coherency policy request 175, coherency policy request 180, generate coherency policy response 185, and coherency policy response 190.

Operational environment 100 is an environment in which an application, such as application 103, can interact with a distributed data storage system, such as system 110, in order to carry out data storage processes. An example of a storage process that may be carried out by the elements of system 110 in operational environment 100 is given by coherency policy management 165, though system 110 may include any number of processes, many of which may be associated with data storage.

Application 103, application 105, application 107, application 109 are each representative of end points of system 110 in operational environment 100. An end user, such as a person, administrator, another application, process, software agent, or the like, interacts with the end points to carry out data storage processes in collaboration with system 110. End users may interact with application 103, application 105, application 107, application 109 via a desktop computer, a laptop computer, or the like. Application 103, application 105, application 107, application 109 allow end users to carry out storage processes, such as storing data, accessing data, managing data, and the like. End users may interface with system 110 to, for example, store and access large volumes of unstructured data for analytics and data lake applications, to secure backup and archiving using object storage, and to manage growing media data, such as video, audio, and images. System 110 may communicate with application 103, application 105, application 107, application 109 in accordance with a number of known communication techniques.

System 110 is representative of a distributed data storage system having a primary node, such as primary node 120, and one or more edge nodes, such as edge node 130, edge node 140, edge node 150, and edge node 160*b*. Primary node 120 is located at a central location while each of edge node 130, edge node 140, edge node 150, and edge node 160 are respectively located at various locations remote to the central location.

Machine learning model 115 is generally representative of a machine learning model that identifies patterns within large datasets and uses those patterns to make decisions or predictions. In some scenarios, machine learning model 115 is leveraged to determine a coherency policy to be applied with respect to a particular data object. To achieve this, inputs are submitted to machine learning model 115 that include characteristics associated with the data object, based on which, the machine learning model outputs a coherency policy for the data object. In some scenarios, training data is generated and used to train machine learning model 115, which is then deployed to system 110. In such scenarios, the training data includes metadata descriptive of one or more data objects and a storage treatment for each of the one or more data objects. The storage treatment corresponds to a coherency policy applied with regard to storing each respective data objects in a storage system. Each of the one or more objects are inputted to machine learning model 115, which is configured to return a coherency policy response (e.g., coherency policy response 190) for each of the one or more data objects. The output from machine learning model 115 corresponding to each of the one or more data objects is compared to the storage treatment for each of the one or more data objects. Based on the comparing for each of the one or more data objects, machine learning model 115 can be updated until such a time where machine learning model 115 provides coherency policy outputs that match the storage treatments for some predetermined threshold percentage or threshold amount of the one or more data objects.

Primary node 120 representative of any hardware, software, and/or firmware component(s) capable of facilitating data storage operations, to interface with a central storage structure of system 110 and edge node 130, edge node 140, edge node 150, and edge node 160. Edge node 130, edge node 140, edge node 150, edge node 160 are each representative of any hardware, software, and/or firmware component(s) capable of facilitating data storage operations and to interface with local storage structures of system 110 and primary node 120. Primary node 120, edge node 130, edge node 140, edge node 150, and edge node 160 may each be employed in the context of a data storage service, or in any other suitable context. Each of edge node 130, edge node 140, edge node 150, edge node 160 may employ method 200 of managing coherency policies, described in more detail below with respect to FIG. 2.

Primary node 120 includes a data storage structure sufficient to store data files or data objects in association with requests generated by end users via an application such as application 103, application 105, application 107, and application 109. In some scenarios, primary node 120 further includes a coherency policy repository, from which an applicable coherency policy can be selected and returned to one of the edge nodes in the form of a coherency policy response.

In some scenarios, each of edge node 130, edge node 140, edge node 150, and edge node 160 generate, in response to receiving requests to store data, coherency policy requests. The coherency policy requests are requests for a coherency policy that can be applied with respect to the requests to store data. In many scenarios, the coherency policy request includes one or more characteristics of the data object to be stored. The coherency policies may implement storage strategies that correspond to strictly coherent caching operations or may implement storage strategies that correspond to eventually coherent caching operations. Which storage strategies are implemented in response to requests to store data in system 110 can be determined in advance or dynamically by primary node 120. In some scenarios, primary node 120 leverages a machine learning model, such as machine learning model 115, in order to select a coherency policy in association with a request to store a data object in system 110. The coherency policies directing the treatment of various requests to store data in system 110 can be stored and retrieved from primary node 120. In some cases, the coherency policies directing how various requests to store data in system 110 are to be treated may also be stored and retrieved from edge node 130, edge node 140, edge node 150, and edge node 160.

Each of edge node 130, edge node 140, edge node 150, and edge node 160 include a data storage structure sufficient to store data files or data objects in association with requests received via application 103, application 105, application 107, or application 109.

Coherency policy management 165 represents strategies for managing and uniformly implementing data coherency policies with respect to requests to store data in system 110. One implementation of coherency policy management 165 is illustrated by elements request to store data object 170, generate coherency policy request 175, coherency policy request 180, generate coherency policy response 185, and coherency policy response 190. Coherency policy management 165 may further include additional elements in other implementations.

Each of request to store data object 170, generate coherency policy request 175, coherency policy request 180, generate coherency policy response 185, and coherency policy response 190 represent a component or process of coherency policy management 165.

Request to store data object 170 is generally representative of a communication, received from an application such as application 103, that requests that a data object be stored in system 110.

Generate coherency policy request 175 is representative of any hardware, software, and/or firmware component(s) capable of determining a coherency policy based on one or more characteristics of the data object to be stored. Generate coherency policy request 175 may be integrated into each of edge node 130, edge node 140, edge node 150, or edge node 160 or may be an independent element leveraged by each of edge node 130, edge node 140, edge node 150, or edge node 160. Where generate coherency policy request 175 receives request to store data object 170, generate coherency policy request 175 produces coherency policy request 180. Coherency policy request 180 is representative of a request generated by edge node 130, edge node 140, edge node 150, or edge node 160 in response to receiving request to store data object 170 from application 103, application 105, application 107, or application 109.

Information included in primary node 120 may include information that defines coherency standards for particular types of data, for data associated with particular end users or applications, or by some other characteristic of the data to be stored. One or more characteristics of the data object to be stored that can be used to inform coherency policy response 190 may be included in coherency policy request 180.

Generate coherency policy response 185 is representative of any hardware, software, and/or firmware component(s) capable of generating coherency policy response 190. Generate coherency policy response 185 may be integrated into primary node 120 or may be an independent element leveraged by primary node 120. Where generate coherency policy response 185 receives coherency policy request 180, coherency policy response 190 is generated. To produce coherency policy response 190, generate coherency policy response 185 identifies an applicable coherency policy based on coherency policy request 180.

In some scenarios, generate coherency policy response 185 queries a storage structure of primary node 120 for the applicable coherency policy. In some scenarios, primary node 120 holds a number of coherency policies in a coherency policy repository. Each of edge node 130, edge node 140, edge node 150, and edge node 160 receive coherency policy response 190 and implement the coherency policy contained therein. In some scenarios, each of edge node 130, edge node 140, edge node 150, and edge node 160 hold a number of coherency policies in a coherency policy repository stored therein, respectively. In such embodiments, coherency policy response 190 includes an indication of the coherency policy, for which each of edge node 130, edge node 140, edge node 150, and edge node 160 contain the corresponding coherency policy.

Coherency policy response 190 is generally representative of a response to coherency policy request 180 that instructs each of edge node 130, edge node 140, edge node 150, and edge node 160 regarding how to treat the data object associated with request to store data object 170. In some scenarios, coherency policy response 190 includes strictly coherent caching operations. Strictly coherent caching operations generally describe processes for caching data at each of edge node 130, edge node 140, edge node 150, and edge node 160 configured to preserve the coherency of data objects or files being stored in system 110.

FIG. 2 illustrates method 200 of operating a distributed data storage system in accordance with an implementation. Method 200 may be implemented in program instructions in the context of the software and/or firmware elements of operational environment 100. The program instructions, when executed by one or more processing devices of one or more computing systems (e.g., computing device 905 in FIG. 9), direct the one or more computing systems to operate as follows, referring parenthetically to the steps in FIG. 2, and in the singular to a computing device for the sake of clarity.

To begin, an edge node a distributed data storage system such as edge node 130 of system 110 as illustrated in FIG. 1, receives a request to store a data object in the distributed data storage system (step 205). The request to store the data object may be received from an application, such as application 103 of FIG. 1. Based on the request to store the data object, the edge node generates a coherency policy request, an example of which is given by coherency policy request 180 of FIG. 1 (step 210). The coherency policy request is representative of a request for a coherency policy that can be applied to the data object with respect to the request to store the data object in the disturbed data storage system. The coherency policy request includes the data object to be stored in the distributed data storage system, one or more characteristics of the data object, and a request for a coherency policy. The edge node submits the coherency policy request to a primary node of a distributed data storage system, such as primary node 120 of system 110 as illustrated in FIG. 1 (step 215).

The primary node receives a coherency policy request and generates a coherency policy response based on the coherency policy request. The coherency policy response includes a coherency policy and is generated based on the data object to be stored in the distributed data storage system and the one or more characteristics of the data object included in the coherency policy request. In some scenarios, the primary node leverages a machine learning model (e.g., machine learning model 115 of FIG. 1) in order to select a coherency policy and generate the coherency policy response. In some scenarios, a vector is generated for the data object, where the elements of the vector correspond to characteristics of the data object. The vector is submitted to a machine learning model configured to receive a vector representation of a data object and to return a coherency policy that can be applied with regard to the request to store the data object in the distributed data storage system. In any case, the primary node generates the coherency policy response and returns it to the edge node that originally submitted the coherency policy request. The edge node then receives the coherency policy response (step 220).

The coherency policy response is processed at the edge node such that the coherency policy can be applied with respect to the request to store the data object. The coherency type of the caching operations included in the coherency policy response may correspond to strictly coherent caching operations or to eventually coherent caching operations. Where the coherency type of the caching operations included in the coherency policy response corresponds to strictly coherent caching operations, the edge node stores the data object in accordance with strictly coherent caching operations (step 230). Alternatively, where the coherency type of the caching operations included in the coherency policy response corresponds to eventually coherent caching operations, the edge node stores the data object in accordance with eventually coherent caching operations (step 235).

Figure 3A:
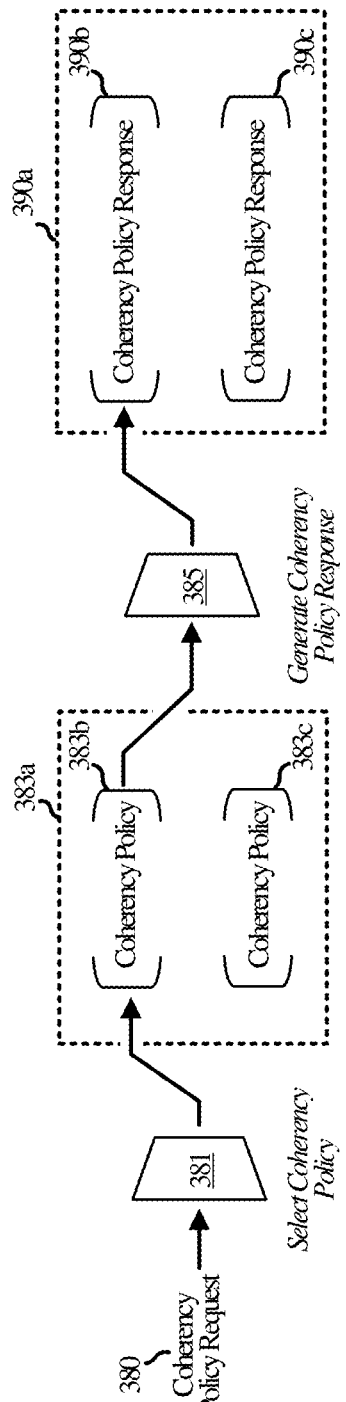
FIG. 3A illustrates an operational scenario in accordance with an implementation.

FIG. 3A illustrates operational scenario 300a in accordance with an implementation. Operational scenario 300a includes coherency policy request 380, select coherency policy 381, data object coherency policy 383a, generate coherency policy response 385, and coherency policy response 390a. Data object coherency policy 383a includes coherency policy 383b and coherency policy 383c. Coherency policy response 390a includes coherency policy response 390b and coherency policy response 390c.

Operational scenario 300a is generally representative of an operation of a coherency policy management process, of which coherency policy management 165 is an example.

Select coherency policy 281 is representative of any hardware, software, and/or firmware component(s) capable of receiving one or more characteristics of a data object, in response, determining a coherency policy for storing the data object based on the one or more characteristics.

Data object coherency policy 383a includes coherency policy 383b and coherency policy 383c. Coherency policy 383b corresponds to strictly coherent caching operations, while coherency policy 383c corresponds to eventually coherent caching operations. As illustrated in FIG. 3A, the output of generate coherency policy response 385 is coherency policy 383b.

Generate coherency policy response 385 is representative of any hardware, software, and/or firmware component(s) capable of evaluating a coherency policy request and to generate a corresponding coherency policy for the coherency policy request, of which coherency policy response 190 of FIG. 1 is an example. Coherency policy response 390a includes coherency policy response 390b and coherency policy response 390c. Coherency policy response 390b corresponds to strictly coherent caching operations, while coherency policy response 390c corresponds eventually coherent caching operations.

Operational scenario 300a begins with the reception of coherency policy request 380. Coherency policy request 380 is received by a primary node (e.g., primary node 120 of FIG. 1) and processed by select coherency policy 381. At select coherency policy 381, the coherency policy request is processed based on the data object and characteristics of the data object included in the request. Based on the information in the request, one of data object coherency policy 383a is selected. As illustrated in FIG. 3A, the outcome of select coherency policy 381 is coherency policy 383b. Coherency policy 383b is fed to generate coherency policy response 385 for processing. Generate coherency policy response 385 receives coherency policy 383b and produces one of coherency policy response 390a. As illustrated in FIG. 3A, coherency policy response 390b is selected based on coherency policy 383b.

The output of generate coherency policy response 385 is coherency policy response 390b, which corresponds to strictly coherent caching operations. The selection of a coherency policy that corresponds to strictly coherent caching operations is predicated on the output of generate coherency policy response 385. Here, the output of generate coherency policy response 385 is coherency policy response 390b, which corresponds to strictly coherent caching operations.

Figure 3B:
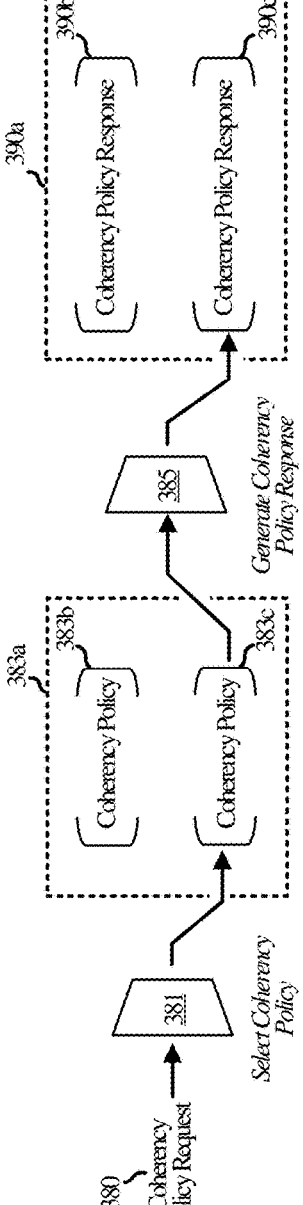
FIG. 3B illustrates another operational scenario in accordance with an implementation.

FIG. 3B illustrates operational scenario 300b in accordance with an implementation. Operational scenario 300b includes coherency policy request 380, select coherency policy 381, data object coherency policy 383a, generate coherency policy response 385, and coherency policy response 390a. Data object coherency policy 383a includes coherency policy 383b and coherency policy 383c. Coherency policy response 390a includes coherency policy response 390b and coherency policy response 390c.

Operational scenario 300a is generally representative of an operation of a coherency policy management process, of which coherency policy management 165 is an example.

Select coherency policy 281 is representative of any hardware, software, and/or firmware component(s) capable of receiving one or more characteristics of a data object, in response, determining a coherency policy for storing the data object based on the one or more characteristics.

Data object coherency policy 383a includes coherency policy 383b and coherency policy 383c. Coherency policy 383b corresponds to strictly coherent caching operations, while coherency policy 383c corresponds to eventually coherent caching operations. As illustrated in FIG. 3B, the output of generate coherency policy response 385 is coherency policy 383c.

Generate coherency policy response 385 is representative of any hardware, software, and/or firmware component(s) capable of evaluating a coherency policy request and to generate a corresponding coherency policy for the coherency policy request, of which coherency policy response 190 of FIG. 1 is an example. Coherency policy response 390a includes coherency policy response 390b and coherency policy response 390c. Coherency policy response 390b corresponds to strictly coherent caching operations, while coherency policy response 390c corresponds eventually coherent caching operations.

Operational scenario 300a begins with the reception of coherency policy request 380. Coherency policy request 380 is received by a primary node (e.g., primary node 120 of FIG. 1) and processed by select coherency policy 381. At select coherency policy 381, the coherency policy request is processed based on the data object and characteristics of the data object included in the request. Based on the information in the request, one of data object coherency policy 383a is selected. As illustrated in FIG. 3A, the outcome of select coherency policy 381 is coherency policy 383c. Coherency policy 383c is fed to generate coherency policy response 385 for processing. Generate coherency policy response 385 receives coherency policy 383c and produces one of coherency policy response 390a. As illustrated in FIG. 3B, coherency policy response 390c is selected based on coherency policy 383c.

The output of generate coherency policy response 385 is coherency policy response 390*c*, which corresponds to strictly coherent caching operations. The selection of a coherency policy that corresponds to strictly coherent caching operations is predicated on the output of generate coherency policy response 385.

Figure 4:
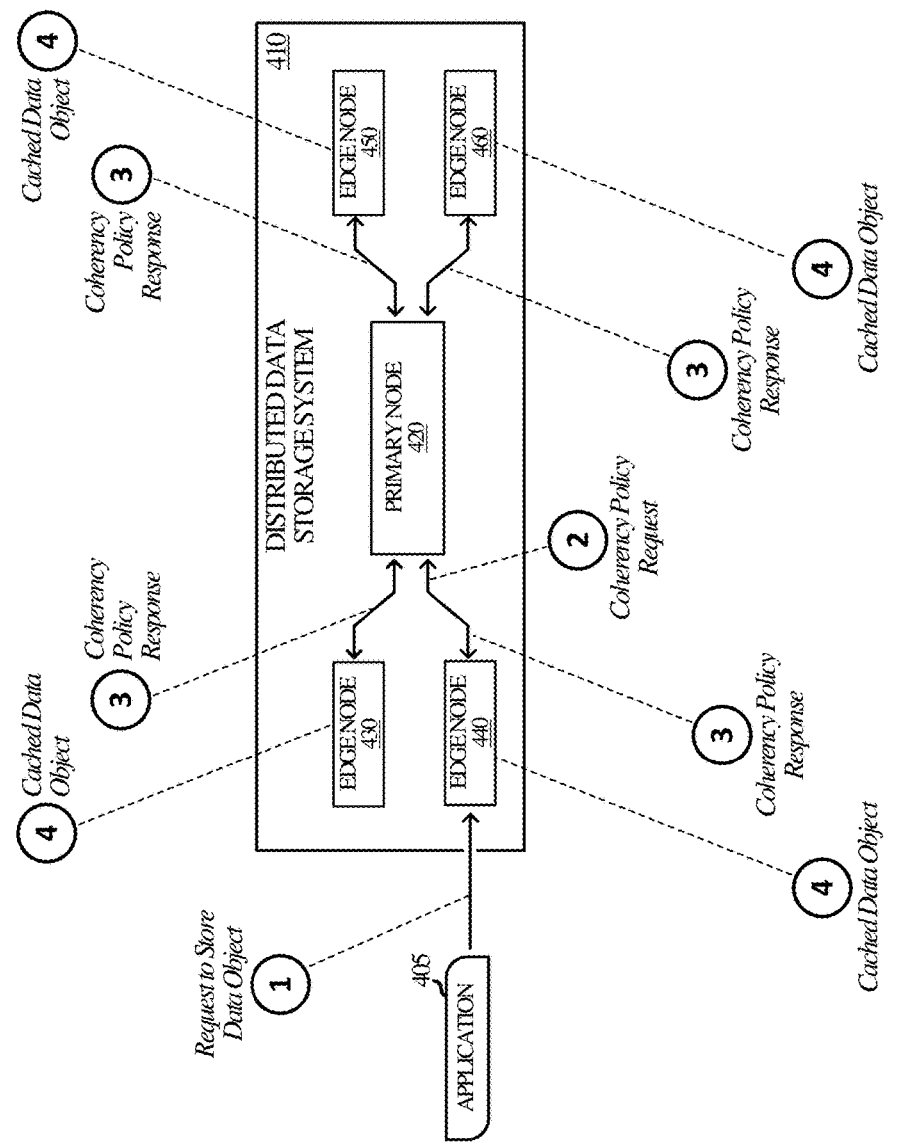
FIG. 4 illustrates another operational scenario in accordance with an implementation.

FIG. 4 illustrates another operational scenario 400 in accordance with an implementation, hereinafter referenced to as scenario 400. Scenario 400 includes application 405 and distributed data storage system 410, hereinafter represented by system 410. System 410 includes primary node 420, edge node 430, edge node 440, edge node 450, edge node 460.

Scenario 400 is representative of an operation of system 410 in which storage processes can be carried out. An example of such an environment is provided by coherency policy management 165 of FIG. 1.

System 410 is representative of a distributed data storage system, an example of which is provided by system 110 of FIG. 1.

Primary node 420 is representative of any hardware, software, and/or firmware component(s) capable of supporting data coherency policies, and particularly coherency policy management, as disclosed herein. An example of such hardware, software, and/or firmware is given by primary node 120 of FIG. 1. Primary node 420 further includes a data storage structure sufficient to store data files or data objects in association with requests generated by an application (e.g., application 103 of FIG. 1). In some scenarios, primary node 420 further includes a coherency policy repository, from which a coherency policy can be selected and returned to one of the edge nodes.

Edge node 430, edge node 440, edge node 450, and edge node 460 are each representative of any hardware, software, and/or firmware component(s) capable of supporting data coherency policies, and particularly coherency policy management (e.g., coherency policy management 165 of FIG. 1) as disclosed herein. Examples of such hardware, software, and/or firmware component(s) are provided by primary node 120, edge node 130, edge node 140, edge node 150, and edge node 160, each of FIG. 1, respectively.

The scenario illustrated in scenario 400 begins with application 405 submitting a request to store a data object to edge node 440 (step 1). Edge node 440 receives the request to store the data object and generates a coherency policy request. Edge node 440 then submits the coherency policy request to primary node 420 (step 2). Primary node 420 receives the coherency policy request and generates a coherency policy response that corresponds to the coherency policy request. The coherency policy response includes a coherency policy to be applied with respect to the request to store the data object. The coherency policy response includes a coherency policy for the data object that defines how the data object is to be treated at edge node 430, edge node 440, edge node 450, and edge node 460. Primary node 420 distributes the edge node 430, edge node 440, edge node 450, and edge node 460 (step 3). Each of edge node 430, edge node 440, edge node 450, and edge node 460 then implements the coherency policy for the data object by storing the data object in accordance with the coherency policy response (step 4).

Figure 5:
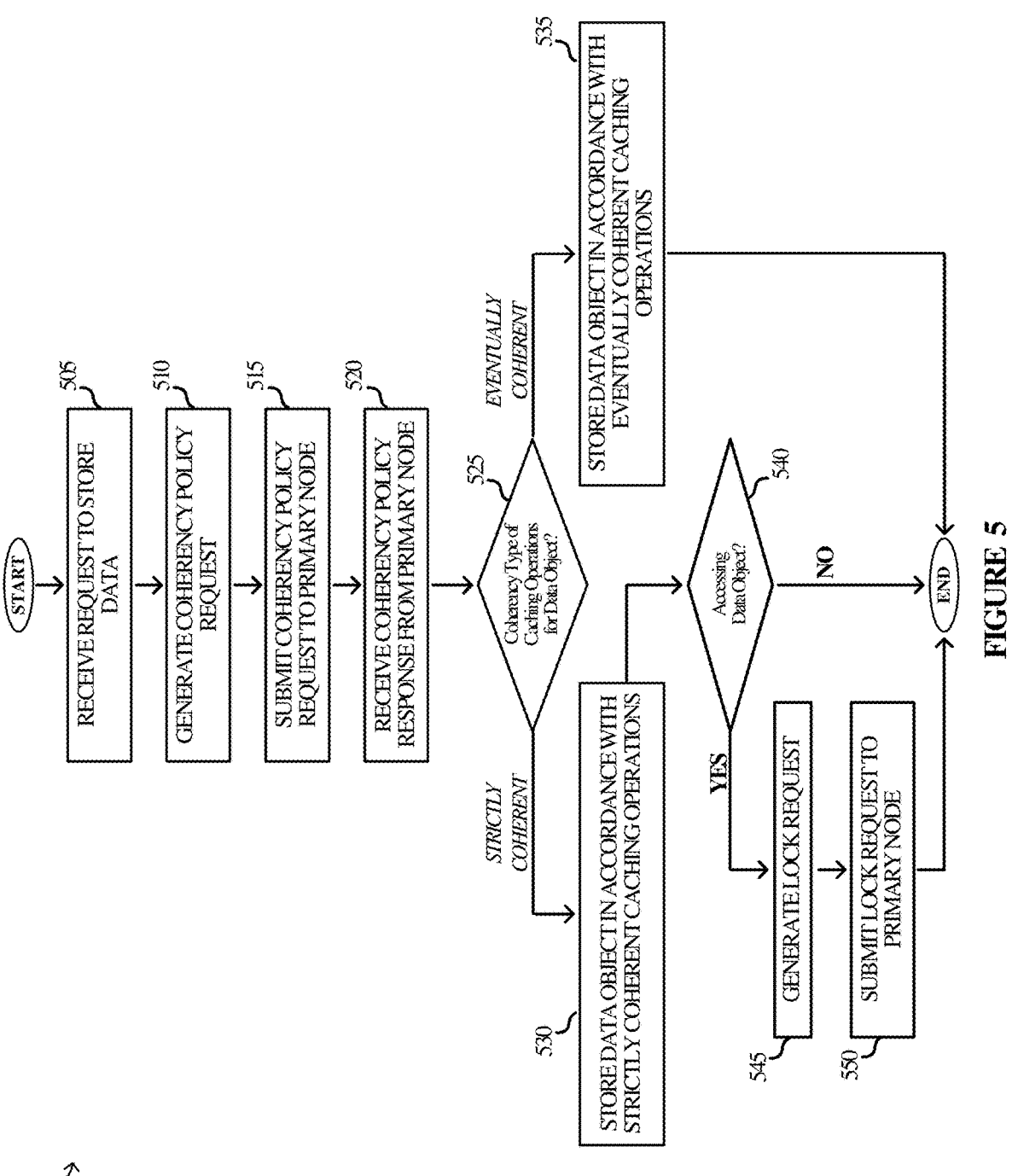
FIG. 5 illustrates another method of operating a distributed data storage system in accordance with an implementation.

FIG. 5 illustrates another method 500 of operating a distributed data storage system in accordance with an implementation, hereinafter referred to as method 500. Method 500 may be implemented in program instructions in the context of the software and/or firmware elements of primary node 420 of FIG. 4. The program instructions, when executed by one or more processing devices of one or more computing systems (e.g., computing device 905 in FIG. 9), direct the one or more computing systems to operate as follows, referring parenthetically to the steps in FIG. 5, and in the singular to a computing device for the sake of clarity. Each of step 505, step 510, step 515, step 520, step 525, step 530, and step 535 of FIG. 5, respectively, are each substantially the same as step 205, step 210, step 215, step 220, step 225, step 230 and step 235 of FIG. 2, respectively.

For data objects stored in accordance with strictly coherent caching operations, the edge node (e.g., edge node 140 of FIG. 1) identifies if any request to access the data object has been received at the edge node (step 540). Where no request to access the data object has been received at the edge node, the method is concluded. Where a request to access the data object has been received at the edge node, the edge node generates a lock request for the data object (step 545). The lock request is a request asking that copies of the data object located at edge nodes other than the edge node having originated the lock request are locked (step 550). Where a lock request is received, the primary node generates a lock instruction directing the recipient to lock the data object where the data object is stored in the other edge nodes of the distributed data storage system. The lock instruction is then distributed to each other edge node of the distributed data storage system.

Figure 6A:
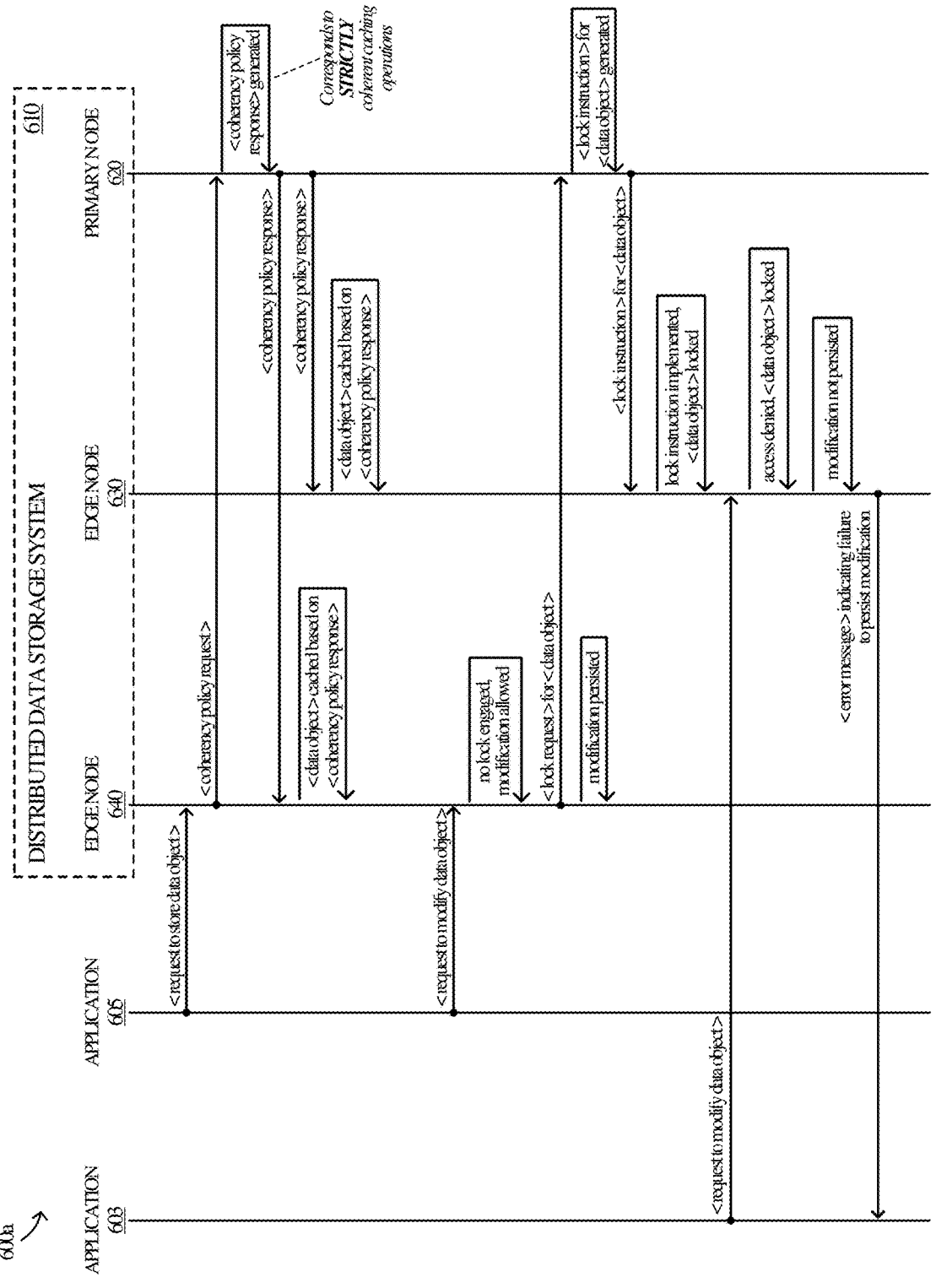
FIG. 6A illustrates an operational sequence in accordance with an implementation.

FIG. 6A illustrates another operational scenario 600*a* in accordance with an implementation, hereinafter referred to as scenario 600*a*. FIG. 6 may be considered in light of the method steps of method 500 illustrated in FIG. 5. Scenario 600*a* includes application 603, application 605, and distributed data storage system 610, hereinafter represented by system 610. System 610 includes primary node 620, edge node 630, and edge node 640.

Scenario 600*a* is representative of a scenario in which an application, such as application 103 of FIG. 1, carries out storage processes by engaging with the elements of a distributed data storage system, such as system 110 of FIG. 1. An example of such an environment is provided by operational environment 100 of FIG. 1.

Application 603 and application 605 are each representative of an application that produces requests to store data objects in a distributed data storage system, of which application 103 of FIG. 1 is an example.

System 610 is representative of a distributed data storage system, an example of which is provided by system 110 of FIG. 1.

Primary node 620, edge node 630, edge node 640, edge node 650, and edge node 660 are each representative of any hardware, software, and/or firmware component(s) capable of supporting data coherency policies, and particularly coherency policy management, as disclosed herein. Examples of such hardware, software, and/or firmware component(s) are provided by primary node 120, edge node 130, edge node 140, edge node 150, and edge node 160, each of FIG. 1, respectively. Each of edge node 630, edge node 640, edge node 650, and edge node 660 further includes a data storage structure sufficient to store data files or data objects in association with requests generated by an application (e.g., application 603).

Scenario 600*a* begins with the submission of a request to store a data object to edge node 640 by application 605. Edge node 640 generates a coherency policy request and submits the coherency policy request to primary node 620. Primary node 620 generates a coherency policy response based on the coherency policy request. As illustrated in FIG. 6A, the coherency policy response includes strictly coherent caching operations. The coherency policy response that includes strictly coherent caching operations is distributed to each of edge node 630 and edge node 640. Edge node 630 and edge node 640 both respectively cache the data object in accordance with the coherency policy response. Here, the data object is cached at both edge node 630 and edge node 640 in accordance with strictly coherent caching operations.

A request to modify, or in other cases a request to access, the data object is received at edge node 640 from application 605. Edge node 640, having received the request, determines that no lock is engaged for the data object and therefore the request to modify the data object from application 605 can be granted. Simultaneously, edge node 640 generates a lock request for the data object and transmits the lock request to primary node 620. Primary node 620 receives the lock request and generates a lock instruction based on the lock request. The lock request is distributed to edge node 630, which implements the lock instruction by locking the data object stored therein.

A subsequent request to modify the data object is received at edge node 630. Edge node 630, however, has locked the data object in response to receiving the lock instruction from primary node 620. Because the data object is locked, edge node 630 denies the request to modify the data object received from application 603. In response to the denial, primary node 620 generates an error message indicating the failure of edge node 630 to persist the modification to the data object and transmits the error message back to application 603.

Figure 6B:
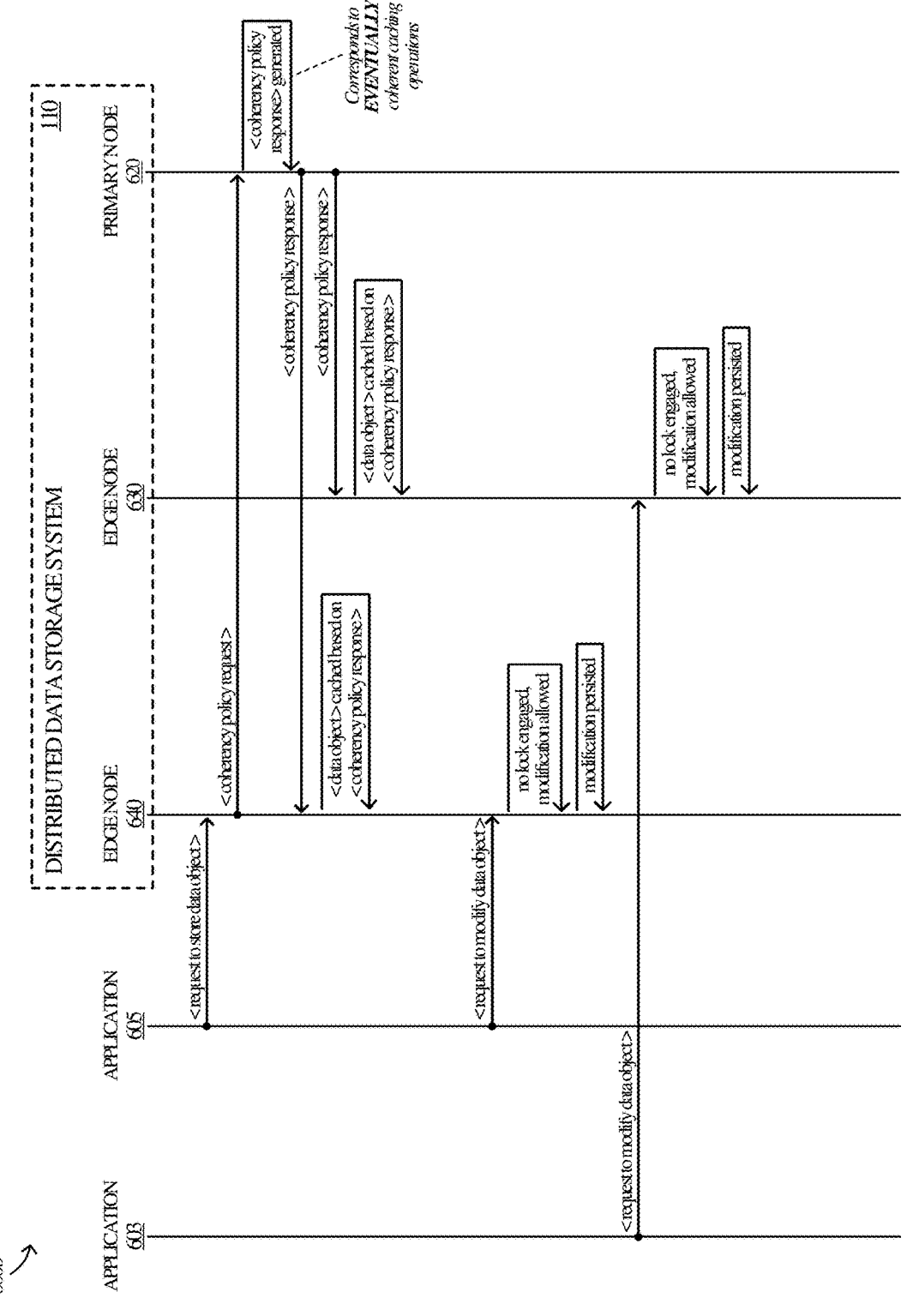
FIG. 6B illustrates another operational sequence in accordance with an implementation.

FIG. 6B illustrates another operational scenario 600b in accordance with an implementation, hereinafter referred to as scenario 600b. FIG. 6 may be considered in light of the method steps of method 500 illustrated in FIG. 5. Scenario 600b includes application 603, application 605, and distributed data storage system 610, hereinafter represented by system 610. System 610 includes primary node 620, edge node 630, and edge node 640.

Scenario 600a is representative of a scenario in which an application, such as application 103 of FIG. 1, carries out storage processes by engaging with the elements of a distributed data storage system, such as system 110 of FIG. 1. An example of such an environment is provided by operational environment 100 of FIG. 1.

Application 603 and application 605 are each representative of an application that produces requests to store data objects in a distributed data storage system, of which application 103 of FIG. 1 is an example.

System 610 is representative of a distributed data storage system, an example of which is provided by system 110 of FIG. 1.

Primary node 620, edge node 630, edge node 640, edge node 650, and edge node 660 are each representative of any hardware, software, and/or firmware component(s) capable of supporting data coherency policies, and particularly coherency policy management, as disclosed herein. Examples of such hardware, software, and/or firmware component(s) are provided by primary node 120, edge node 130, edge node 140, edge node 150, and edge node 160, each of FIG. 1, respectively. Each of edge node 630, edge node 640, edge node 650, and edge node 660 further includes a data storage structure sufficient to store data files or data objects in association with requests generated by an application (e.g., application 603).

Scenario 600b begins with the submission of a request to store a data object to edge node 640 by application 605. Edge node 640 generates a coherency policy request and submits the coherency policy request to primary node 620.

Primary node 620 generates a coherency policy response based on the coherency policy request. As illustrated in FIG. 6B, the coherency policy response includes eventually coherent caching operations. The coherency policy response that includes eventually coherent caching operations is distributed to each of edge node 630 and edge node 640. Edge node 630 and edge node 640 both respectively cache the data object in accordance with the coherency policy response. Here, the data object is cached at both edge node 630 and edge node 640 in accordance with eventually coherent caching operations.

A request to modify, or in other cases a request to access, the data object is received at edge node 640 from application 605. Edge node 640, having received the request, determines that no lock is engaged for the data object and therefore the request to modify the data object from application 605 can be granted.

A subsequent request to modify the data object is received at edge node 630. Edge node 630, having received the request, determines that no lock is engaged for the data object and therefore the request to modify the data object from application 603 can be granted. In response to the approval of the request, edge node 630 persists the modification to the data object to the distributed data storage system.

Figure 7:
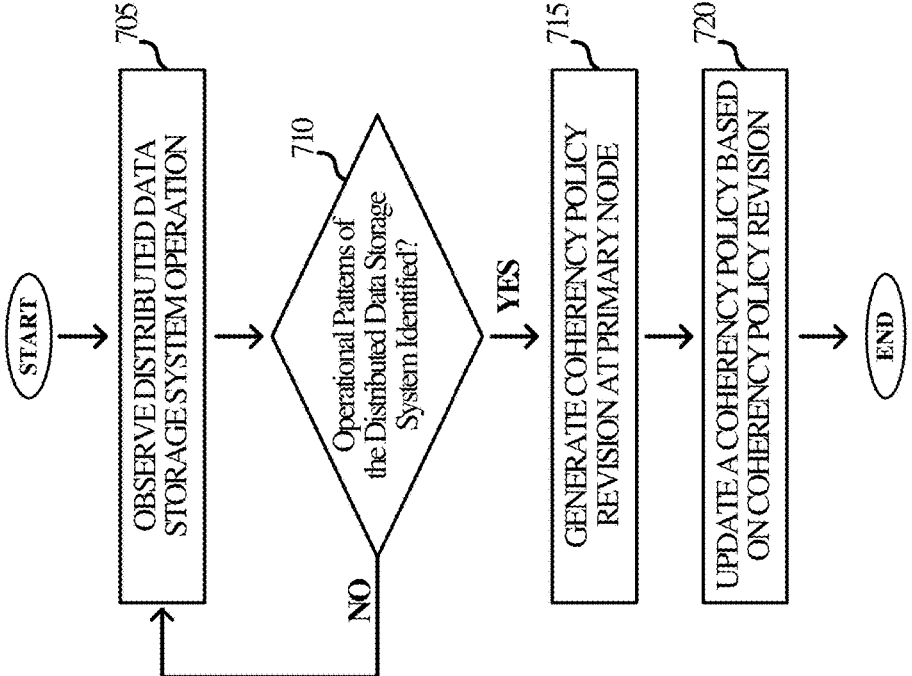
FIG. 7 illustrates another method of operating a distributed data storage system in accordance with an implementation.

FIG. 7 illustrates another method 700 of operating a distributed data storage system, hereinafter represented by method 700. Method 700 may be implemented in program instructions in the context of the software and/or firmware elements of primary node 120. The program instructions, when executed by one or more processing devices of one or more computing systems (e.g., computing device 905 in FIG. 9), direct the one or more computing systems to operate as follows, referring parenthetically to the steps in FIG. 2, and in the singular to a computing device for the sake of clarity.

To begin, the primary node of a distributed data storage system, such as primary node 120 of FIG. 1, observes the operation of a distributed data storage system (step 705). To observe the operation of the distributed data storage system, the primary node searches for operational patterns with regard to what data objects are stored in the distributed data storage system, where the data objects are stored, which edge nodes receive requests associated with which data objects, and the like.

Where operational patterns are not identified, the primary node continues to observe the operation of the distributed data storage system to search for operational patterns (step 710). Where operational patterns of the distributed data storage system are identified, the identified operational patterns are leveraged by the primary node (step 710). Based on the identified operational patterns, the primary node generates a coherency policy revision. The coherency policy revision is generally representative of a revision to a coherency policy intended to improve the performance of the distributed data storage system. Based on the coherency policy revision, the primary node updates a coherency policy (step 720).

Figure 8:
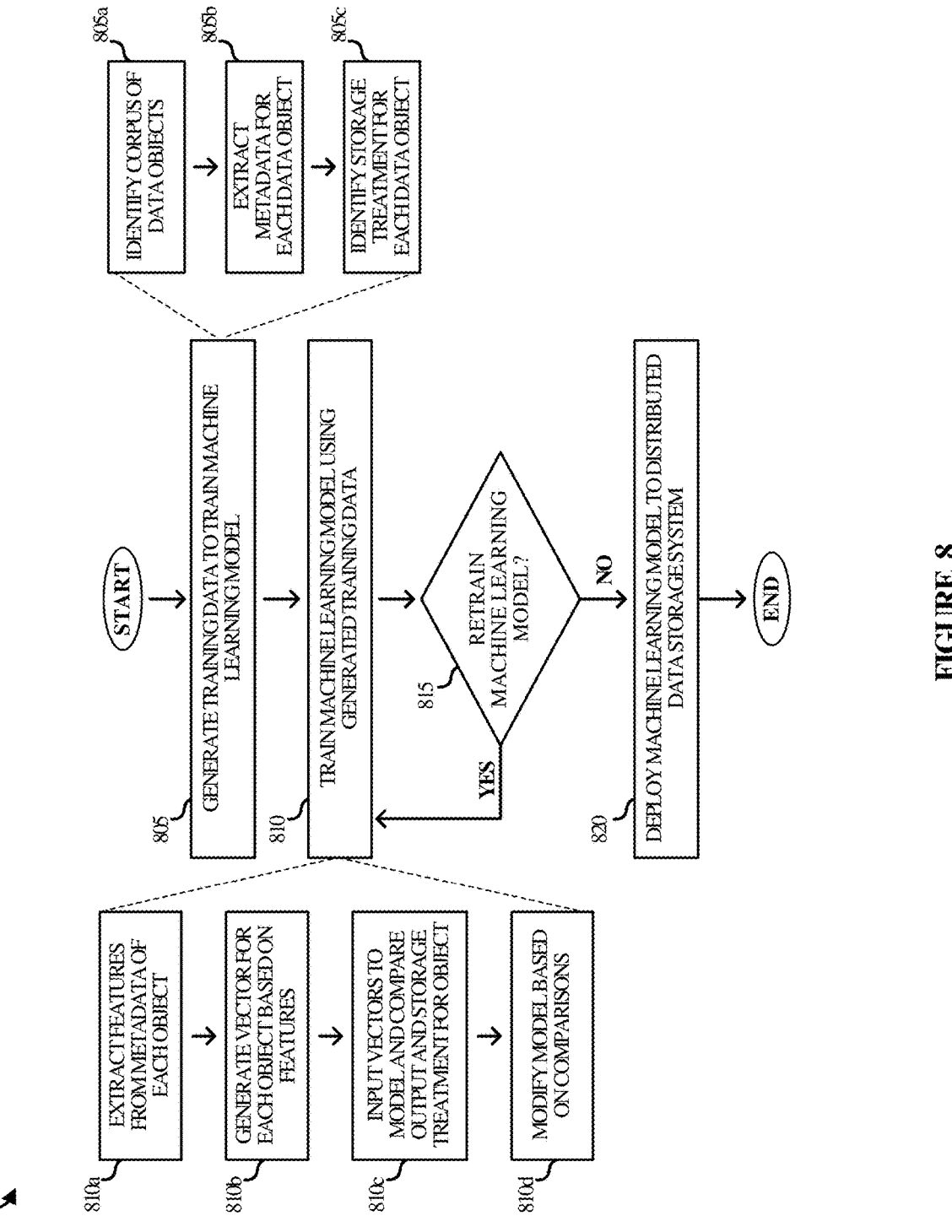
FIG. 8 illustrates another method of operating a distributed data storage system in accordance with an implementation.

FIG. 8 illustrates another method 800 of operating a distributed data storage system, hereinafter represented by method 800. Method 800 may be implemented in program instructions in the context of the software and/or firmware elements of primary node 120 and machine learning model 115 of FIG. 1. The program instructions, when executed by one or more processing devices of one or more computing systems (e.g., computing device 905 in FIG. 9), direct the one or more computing systems to operate as follows, referring parenthetically to the steps in FIG. 8, and in the singular to a computing device for the sake of clarity.

To begin, training data for training a machine learning model is generated (step 805). To generate the training data, a corpus of existing data objects is identified (step 805a). The corpus of existing data objects is generally representative of data objects have been previously stored in a distributed data storage system. For each of the corpus of data objects, metadata is extracted (step 805b). For each data object of the corpus of data objects, a storage treatment is identified (805c). The storage treatment corresponds to a coherency policy applied to the data object. In some examples, the coherency policy having been applied to each data object of the corpus of existing data objects was generated and applied by an administrator.

The machine learning model is then trained using the generated training data (step 810). To train the machine learning model, features are extracted from the metadata corresponding to each of the corpus of existing data objects (step 810a). Based on the metadata, features are identified for each data object, and a vector is generated based on the features (step 810b). The features of the vector correspond to the features of the corresponding data object. The vectors are submitted to a machine learning model that is configured to receive feature vectors corresponding to data objects as an inputs and, in response, to return a coherency policy to be applied for storing the respective data object in the distributed data storage system. The output for each respective data object of the corpus of data objects is compared with the corresponding storage treatment for the data object (step 810c). For example, the storage treatment identified for a given data object may indicate that the data object should be stored in accordance with strictly coherent caching operations, while the output of the machine learning model indicates that the data object should be stored in accordance with eventually coherent caching operations. The machine learning model can be modified based on the discrepancy between the output and the storage treatment (step 810d).

It is then determined whether or not the machine learning model requires further training (step 815). In some embodiments, the machine learning model is trained until such a time where a predetermined number or proportion of the machine learning model outputs for the corpus of existing data objects matches the storage treatment for the corresponding data objects of the corpus of data objects. Where it is determined that the machine learning model requires further training, method 800 continues to train the machine learning model based on the training data. Where it is determined that the machine learning model does not require further training, the machine learning model can be deployed to a distributed data storage system (step 820). This may be the same distributed storage system corresponding to the corpus of data objects and the corresponding storage treatment or may be a different instance of a distributed data storage system. In either case, the machine learning model is deployed to the distributed data storage system, where it can be leveraged to determine coherency policies for newly submitted data objects or other existing data objects.

Figure 9:
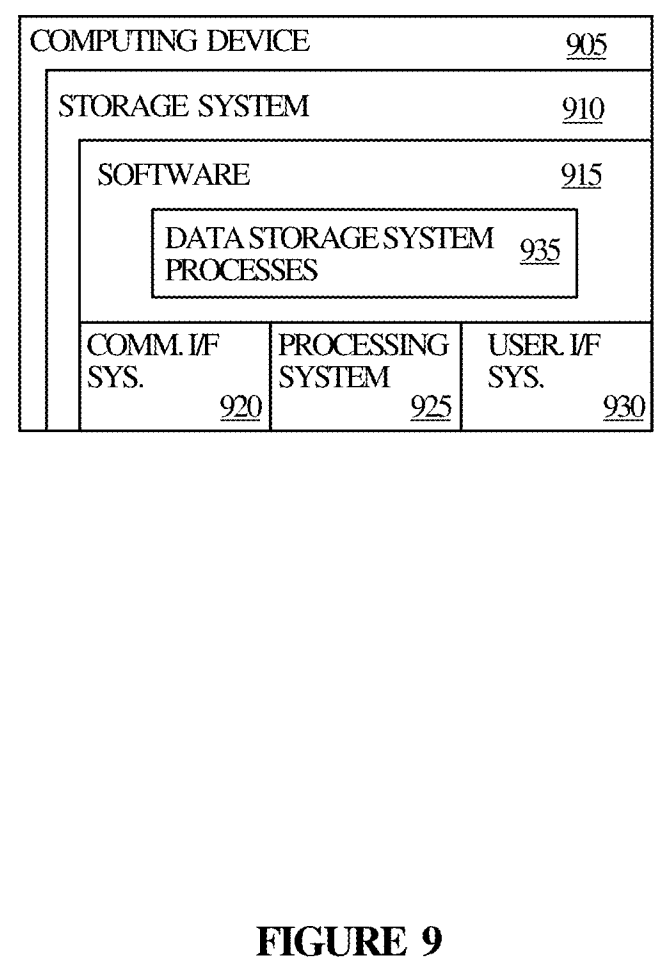

FIG. 9 illustrates computing device 905 used in accordance with some implementations. illustrates computing device 905, which is representative of any system or collection of systems in which the various applications, processes, services, and scenarios disclosed herein may be implemented. Examples of computing device 905 include, but are not limited to server computers, web servers, cloud computing platforms, and data center equipment, as well as any other type of physical or virtual server machine, container, and any variation or combination thereof (In some examples, computing device 905 may also be representative of desktop and laptop computers, tablet computers, and the like.)

Computing device 905 may be implemented as a single apparatus, system, or device or may be implemented in a distributed manner as multiple apparatuses, systems, or devices. Computing device 905 includes, but is not limited to, processing system 925, storage system 910, software 915, communication interface system 920, and user interface system 930. Processing system 925 is operatively coupled with storage system 910, communication interface system 920, and user interface system 930.

Processing system 925 loads and executes software 915 from storage system 910. Software 1015 includes and implements data storage system processes 935, which is representative of the processes discussed with respect to the preceding Figures, such as method 200. When executed by processing system 925, software 915 directs processing system 925 to operate as described herein for at least the various processes, operational scenarios, and sequences discussed in the foregoing implementations. Computing device 905 may optionally include additional devices, features, or functionality not discussed for purposes of brevity.

Referring still to FIG. 9, processing system 925 may include a microprocessor and other circuitry that retrieves and executes software 915 from storage system 910. Processing system 925 may be implemented within a single processing device but may also be distributed across multiple processing devices or sub-systems that cooperate in executing program instructions. Examples of processing system 925 include general purpose central processing units, microcontroller units, graphical processing units, application specific processors, integrated circuits, application specific integrated circuits, and logic devices, as well as any other type of processing device, combinations, or variations thereof.

Storage system 910 may comprise any computer readable storage media readable by processing system 925 and capable of storing software 915. Storage system 910 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 910 may be implemented as a single storage device but may also be implemented across multiple storage devices or sub-systems co-located or distributed relative to each other. Storage system 910 may comprise additional elements, such as a controller, capable of communicating with processing system 925 or possibly other systems.

Software 915 (including data storage system processes 935) may be implemented in program instructions and among other functions may, when executed by processing system 925, direct processing system 925 to operate as described with respect to the various operational scenarios, sequences, and processes illustrated herein. For example, software 915 may include program instructions for implementing write allocation processes and procedures as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 915 may include additional processes, programs, or components, such as operating system software, virtualization software, or other application software. Software 915 may also comprise firmware or some other form of machine-readable processing instructions executable by processing system 925.

In general, software 915, when loaded into processing system 925 and executed, transforms a suitable apparatus, system, or device (of which computing device 905 is representative) overall from a general-purpose computing system into a special-purpose computing system customized to support write allocation as described herein. Indeed, encoding software 915 on storage system 910 may transform the physical structure of storage system 910. The specific transformation of the physical structure may depend on various factors in different implementations of this description. Examples of such factors may include, but are not limited to, the technology used to implement the storage media of storage system 910 and whether the computer-storage media are characterized as primary or secondary storage, as well as other factors.

For example, if the computer readable storage media are implemented as semiconductor-based memory, software 915 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 920 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 905 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a distributed data storage system, the method comprising:
   receiving, at an edge node of the distributed data storage system, a request to store a data object;
   transmitting, by the edge node, a request to obtain a coherency policy from a primary node of the distributed data storage system, wherein the request identifies one or more characteristics of the data object, and wherein the primary node selects the coherency policy based on the characteristics of the data object;
   receiving, from the primary node, a response that identifies the coherency policy, wherein:
   the coherency policy is one of a number of coherency policies, and
   the number of coherency policies comprises strictly coherent caching operations and eventually coherent caching operations; and
   storing, by the edge node, the data object in accordance with the coherency policy.

2. The method of claim 1, wherein:
   strictly coherent caching operations comprise caching operations that synchronize copies of the data object without a delay in response to a modification of the data object; and
   eventually coherent caching operations comprise caching operations that synchronize copies of the data object after a delay in response to a modification of the data object.

3. The method of claim 1, the method further comprising receiving, at the edge node, the request to store the data object from an application remote to the edge node.

4. The method of claim 3, the method further comprising identifying, by the edge node, the one or more characteristics of the data object based on metadata associated with the data object.

5. The method of claim 1, wherein the one or more characteristics of the data object comprise an object type of the data object and a corresponding application for the data object.

6. The method of claim 1, the method further comprising determining the coherency policy based on the one or more characteristics of the data object.

7. The method of claim 6, wherein determining the coherency policy based on the one or more characteristics of the data object comprises:

generating a vector for the data object, and submitting the vector to a machine learning model trained to receive the vector as an input and, in response, to return the coherency policy.

8. The method of claim 1, the method further comprising:

generating, by the edge node, a lock request for the data object, the lock request comprising a request to lock one or more copies of the data object on each of one or more other edge nodes of the distributed data storage system; and transmitting, by the edge node, the lock request to the primary node.

9. The method of claim 1, the method further comprising:

receiving, by the edge node, a lock instruction for the data object, the lock instruction comprising instructions to lock the data object on the edge node; and locking, based on the lock instruction, the data object.

10. A computing device comprising:

one or more non-transitory computer readable storage media;

one or more processors operatively coupled with the one or more computer readable storage media; and a distributed data storage system comprising program instructions stored on the one or more computer readable storage media, wherein the program instructions, when executed by the one or more processors, direct the computing device to at least:

receive, at a primary node of the distributed data storage system, a request to obtain a coherency policy from the primary node, wherein:

the request to obtain the coherency policy corresponds to a request to store a data object in the distributed data storage system; and the request to obtain the coherency policy identifies one or more characteristics of the data object, determine the coherency policy based on the one or more characteristics of the data object, wherein:

the coherency policy is one of a number of coherency policies; and the number of coherency policies comprises strictly coherent caching operations and eventually coherent caching operations, and transmit a response that identifies the coherency policy to an edge node of the distributed data storage system.

11. The computing device of claim 10, wherein:

strictly coherent caching operations comprise caching operations that synchronize copies of the data object without a delay in response to a modification of the data object; and eventually coherent caching operations comprise caching operations that synchronize copies of the data object after a delay in response to a modification of the data object.

12. The computing device of claim 10, wherein the program instructions directing the computing device to receive the request to obtain the coherency policy further comprise instructions that, when executed, direct the computing device to:

receive the request to obtain the coherency policy from the edge node of the distributed data storage system.

13. The computing device of claim 10, wherein the one or more characteristics of the data object comprise an object type of the data object and a corresponding application for the data object.

14. The computing device of claim 13, wherein the program instructions directing the computing device to determine the coherency policy based on the one or more characteristics of the data object further comprise instructions that, when executed, direct the computing device to:

determine the coherency policy based on the object type of the data object and the corresponding application for the data object.

15. The computing device of claim 10, wherein the program instructions directing the computing device to determine the coherency policy based on the one or more characteristics of the data object further comprise instructions that, when executed, direct the computing device to:

generate a vector for the data object, the vector having features that correspond to the one or more characteristics of the data object, and submit the vector to a machine learning model trained to receive the vector as an input and, in response, to return the coherency policy.

16. The computing device of claim 10, wherein the program instructions further comprise instructions that, when executed, direct the computing device to:

receive a lock request for the data object, the lock request comprising a request to lock one or more copies of the data object on each of one or more other edge nodes of the distributed data storage system;

generate, based on the lock request for the data object, a lock instruction comprising instructions that direct each of one or more other edge nodes to lock one or more copies of the data object therein; and transmit the lock instruction to the each of one or more other edge nodes.

17. The computing device of claim 10, wherein the program instructions further comprise instructions that, when executed, direct the computing device to:

receive, at the edge node, a lock instruction for the data object, the lock instruction comprising instructions to lock the data object on the edge node; and lock, based on the lock instruction, the data object.

18. The computing device of claim 10, wherein the program instructions further comprise instructions that, when executed, direct the computing device to:

distribute the response to one or more other edge nodes of the distributed data storage system.

19. The computing device of claim 18, wherein the program instructions further comprise instructions that, when executed, direct the computing device to:

acquire, at the primary node, a current version of the data object; and distribute the current version of the data object to each of the one or more other edge nodes.

20. A method of operating a distributed data storage system, the method comprising:

receiving, at a primary node of the distributed data storage system, a request to obtain a coherency policy from the primary node, wherein:

the request to obtain the coherency policy corresponds to a request to store a data object in the distributed data storage system; and the request to obtain the coherency policy identifies one or more characteristics of the data object, determining, by the primary node, the coherency policy based on the one or more characteristics of the data object, wherein:

the coherency policy is one of a number of coherency policies, and the number of coherency policies comprises strictly coherent caching operations and eventually coherent caching operations, and transmitting, from the primary node to an edge node of the distributed data storage system, a response that identifies the coherency policy.

\*   \*   \*   \*   \*